US008819573B2

(12) United States Patent
Chakra et al.

(10) Patent No.: US 8,819,573 B2
(45) Date of Patent: Aug. 26, 2014

(54) ACCLIMATIZING A USER TO A SCHEDULING PATTERN CHANGE

(75) Inventors: Al Chakra, Apex, NC (US); Liam Harpur, Dublin (IE); Mark Kelly, Dublin (IE); John Rice, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 13/045,226

(22) Filed: Mar. 10, 2011

(65) Prior Publication Data
US 2012/0233563 A1 Sep. 13, 2012

(51) Int. Cl.
G06F 3/048 (2013.01)
G04B 19/22 (2006.01)
G06Q 10/00 (2012.01)

(52) U.S. Cl.
USPC ........... 715/772; 368/21; 705/7.18; 705/7.19; 705/7.22

(58) Field of Classification Search
USPC ........... 715/772; 368/21; 705/7.18, 7.19, 7.22
See application file for complete search history.

(56) References Cited

U.S. PATENT DOCUMENTS

| 5,006,985 | A | * | 4/1991 | Ehret et al. ............... 705/1.1 |
| 7,783,988 | B2 | * | 8/2010 | Curran ..................... 715/780 |
| 2002/0038234 | A1 | * | 3/2002 | Fu et al. ..................... 705/8 |
| 2005/0114191 | A1 | * | 5/2005 | Atkin et al. ................ 705/8 |
| 2009/0168609 | A1 | * | 7/2009 | Weir et al. ................. 368/21 |
| 2009/0216601 | A1 | | 8/2009 | B.S. |

* cited by examiner

Primary Examiner — Haoshian Shih
(74) Attorney, Agent, or Firm — Steven L. Nichols; Van Cott, Bagley, Cornwall & McCarthy P.C.

(57) ABSTRACT

Acclimatizing a user to a scheduling pattern change includes: in a calendar system implemented by at least one processor, determining an anticipated scheduling pattern change for the user; establishing with the calendar system an acclimatization period to transition the user to the scheduling pattern change; receiving in the calendar system a request to schedule an event for the user at a time within the acclimatization period; and prompting the user to reschedule the event to a time outside of the acclimatization period with the calendar system.

20 Claims, 9 Drawing Sheets

ACCLIMATIZING A USER TO A SCHEDULING PATTERN CHANGE

BACKGROUND

Aspects of the present specification relate to computerized calendar systems. In particular, aspects of the present specification relate to the use of computerized calendar systems to acclimatize a user to a scheduling pattern change.

The modern business environment often requires a person to travel to meet with people or attend scheduled events in a location that is far from the person's home. Often such travel is to a different time zone from one to which the person is accustomed. For example, the person may be used to scheduling events related to his or her employment during normal business hours in his home time zone.

However, if the person plans to travel to a time zone that is many hours ahead of his or her home time zone, the person may have difficulty remembering to schedule events for his or her time in the different time zone at times that are appropriate to the different time zone. Moreover, once the person arrives at the new time zone, he or she may at first have difficulty overcoming the physical effects of changing time zones to attend meetings or other events scheduled for certain times of the day (e.g., early in the morning). Once the person has fully acclimatized to the new time zone, he or she may then be faced with the difficulty upon returning home of acclimatizing to his or her home time zone.

BRIEF SUMMARY

A method of acclimatizing a user to a scheduling pattern change includes: in a calendar system implemented by at least one processor, determining an anticipated scheduling pattern change for the user; establishing with the calendar system an acclimatization period to transition the user to the scheduling pattern change; receiving in the calendar system a request to schedule an event for a time within the acclimatization period; and prompting the user to reschedule the event to a time outside of the acclimatization period with the calendar system.

A method of acclimatizing a user to a scheduling pattern change includes: in a calendar system implemented by at least one processor, determining an anticipated scheduling pattern change for said user; establishing with said calendar system an acclimatization period to acclimatize said user to said scheduling pattern change; determining that an event scheduled for said user falls within said acclimatization period; and determining whether to reschedule said event to a time outside of said acclimatization period based on at least one attribute associated with said event.

A computer program product for acclimatizing a user to a scheduling pattern change includes a tangible computer readable storage medium having computer readable program code embodied therewith. The computer readable program code includes: computer readable program code configured to determine an anticipated scheduling pattern change for the user; computer readable program code configured to establish an acclimatization period to transition the user to the scheduling pattern change; computer readable program code configured to receive a request to schedule an event in a calendar for the user at a time within the acclimatization period; and computer readable program code configured to prompt the user to reschedule the event to a time outside of the acclimatization period.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
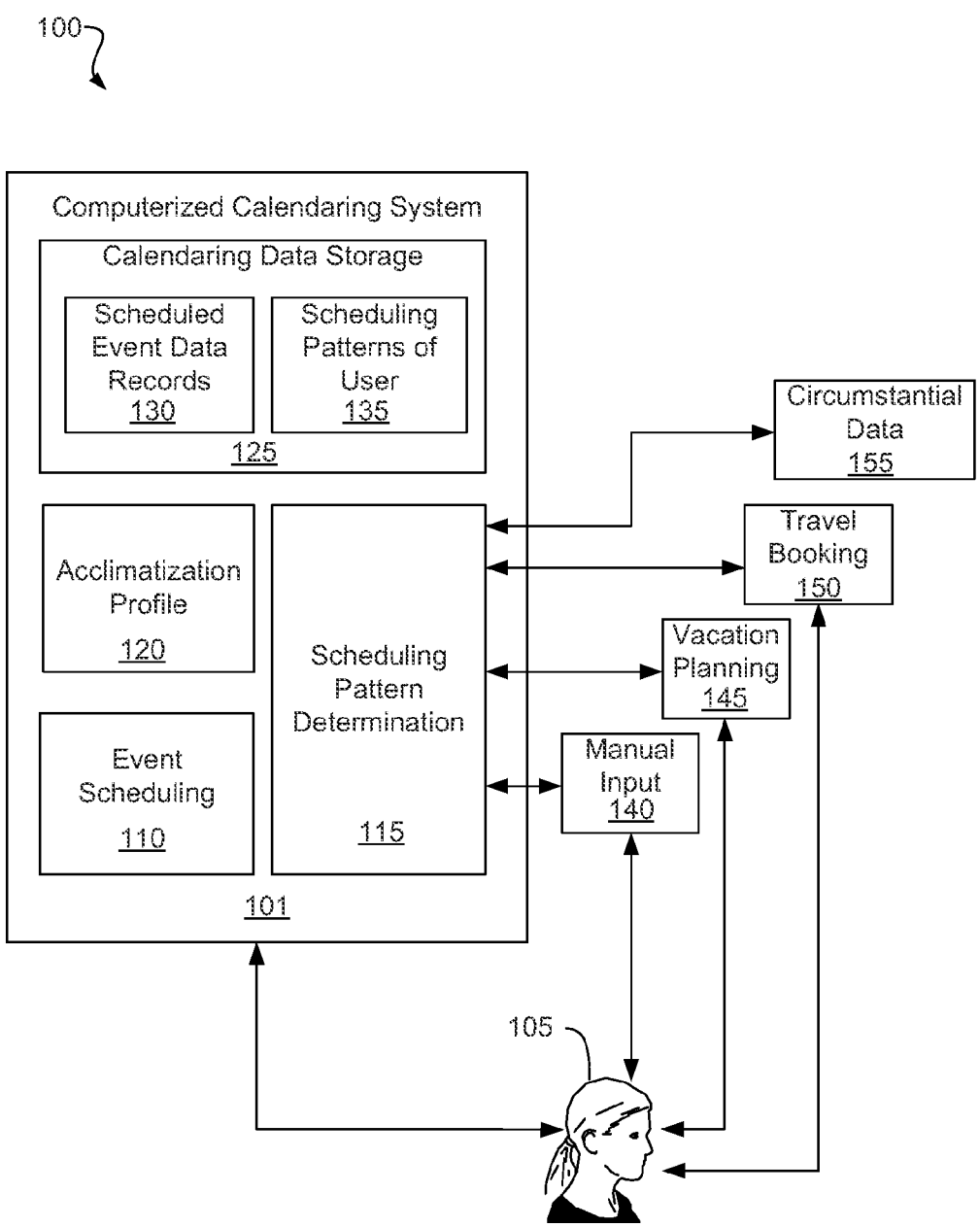
FIG. 1 is a block diagram of an illustrative computerized calendar system, according to one example of principles described herein.

The present specification discloses methods, systems, and computer program products for aiding a user of a calendar system to schedule events in the context of changing scheduling patterns for the user. In these methods, systems, and computer program products, the calendar system stores and manages events in a calendar for the user. The calendar system calendar system may detect a planned scheduling pattern change for the user and generate one or more acclimatization periods to allow the user to become progressively accustomed to the new scheduling pattern. If the calendar system detects an event scheduled for the user within the acclimatization period, the calendar system may take action to reschedule the event to a time outside of the acclimatization period.

As used in the present specification and in the appended claims, the term "calendar system" refers to a computer-implemented system that stores and manages records corresponding to scheduled events for a user and provides the user with access to the records in a calendar format.

As used in the present specification and in the appended claims, the term "scheduling pattern" refers to a pattern specifying daily time period(s) in which events are typically scheduled for a user and the time period(s) for which events are typically not scheduled for the user. A scheduling pattern may be specific to a particular location or time zone. For example, a scheduling pattern associated with Raleigh, N.C. may specify that events are typically scheduled between the hours of 8 am and 6 pm according to Raleigh time. Similarly, a scheduling pattern associated with Dublin, Ireland may specify that events are typically scheduled between the hours of 8 am and 6 pm according to Dublin time. Such scheduling patterns may also vary by date, by user, and by specific implementations of a calendar system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a. portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the Figures, FIG. 1 shows a block diagram of an illustrative calendar system (101) which manages a schedule of events for a user (105). The user (105) can access information about scheduled events for the user (105) through a calendar interface provided by the calendar system (101). Additionally, the calendar system (101) may allow the user to create new scheduled events, receive and respond to invitations to scheduled events from third-parties, invite third parties to scheduled events, reschedule events to new times, receive reminders for scheduled events, and/or perform any other functionality associated with maintaining a calendar of events for the user (105).

The calendar system (101) may be implemented by one or more servers with which the user (105) can communicate over a network using a web interface and/or a client installed on a device possessed by the user (105). Alternatively, the calendar system (101) may be implemented entirely on a device possessed by or accessible to the user (105).

Various elements of functionality performed by the calendar system (101) are illustrated in FIG. 1 as subsystems (110, 115, 120, 125). These subsystems include an event scheduling subsystem (110), a scheduling pattern determination subsystem (115), an acclimatization profile subsystem (120), and a calendar data storage subsystem (125). When a new event is scheduled for the user (105), the event scheduling subsystem (110) creates a new data record for the scheduled event. The new data record is stored by the calendar data storage subsystem (125). The data record for the event may include information about the event, such as a title of the event, a date and time of the event, a location of the event, a duration of the event, invited participants for the event, and the like. The scheduled event data records (130) stored by the scheduling subsystem (125) may be synthesized by the computerized calendar system (101) to render a calendar for the user (105).

The calendar data storage subsystem (125) also keeps track of scheduling patterns (135) for the user (105). Each scheduling pattern (135) stored for the user (105) may serve as a reference for the typical times during a day in which an event may be scheduled for the user (105). For example, for periods during which the user (105) is in Raleigh, N.C., the user (105) may schedule events according to a first scheduling pattern, in which most events are scheduled between 8 am and 6 pm in the time zone of the eastern United States. However, for periods during which the user is in Dublin, Ireland, the user (105) may desire to schedule events according to a second scheduling pattern, in which most events are scheduled between 8 am and 6 pm in the time zone of Dublin.

By keeping track of the different scheduling patterns applicable to the user (105) during different periods of one or more days, the calendar system (101) may prevent the user (105) from inadvertently scheduling an event on a day at time that conflicts with the scheduling pattern applicable to the user (105) for that day. Returning to the example of the user (105) in Raleigh, the user (105) may receive an invitation to a teleconference scheduled for 4 pm, Raleigh time, on a day that the user (105) plans to be in Dublin. Before allowing the user (105) to accept the invitation and add the teleconference event to the user's schedule, the calendar system (101) may determine that the proposed event falls outside of the hours of 8 am and 6 pm, Dublin time, and that the proposed event is therefore in violation of the Dublin scheduling pattern applicable to the user (105) for the day of the event. The calendar system (101) may remind the user (105) that the user (105) will be in Dublin on the day the event is proposed to occur, and that the time proposed for the event conflicts with the user's Dublin scheduling pattern. The calendar system (101) may also prompt the user (105) to decide whether to schedule the event anyway, decline to attend the event, and/or attempt to reschedule the event for a more suitable time. Alternatively, the calendar system (101) may automatically prevent the user (105) from accepting the invitation and/or propose a new time for the teleconference to the organizer of the teleconference.

The calendar system (101) may discover the scheduling patterns applicable to different days on the calendar of the user (105) in a number of ways. For example, the user (105) may provide manual input (140) to the scheduling pattern determination subsystem (115) to instruct the scheduling pattern determination subsystem (115) to apply a certain scheduling pattern to a certain day or period of days. Additionally or alternatively, the calendar system (101) may associate different scheduling patterns with different locations or time zones. In this way, the scheduling pattern determination subsystem (115) may determine a planned location for the user (105) on a given day or period of days, retrieve the scheduling pattern for that location, and apply it to that day or period of days.

In some examples, the scheduling pattern determination subsystem (115) may determine the planned location of the user (105) for a day or period of days through a connection to a vacation planning service (145) or a travel booking service (150) used by the user (105) to plan vacation time or book business travel. Thus, if the user (105) books a business trip to Dublin for a certain week using the travel booking service (150), the scheduling pattern determination may determine from the travel booking service (150) that the user (105) will be in Dublin for that week, retrieve a scheduling pattern corresponding to Dublin, and apply that scheduling pattern to the days of the week for which the user (105) plans to be in Dublin.

Additionally, or alternatively, the scheduling pattern determination subsystem (115) may determine a planned location of the user (105) for one or more days using circumstantial data (155) from the user's calendar. For example, if the calendar of the user (105) includes a period of three days for which the user (105) plans to attend events scheduled to occur in Dublin, the scheduling pattern determination subsystem (115) may determine that the user (105) plans to be in Dublin for those three days and apply the scheduling pattern associated with Dublin to each of the three days.

The calendar system (101) may also identify scheduled transitions for the user (105) from one scheduling pattern to another scheduling pattern, and help the user (105) acclimatize to those changes. Returning to the example of the user (105) located in Raleigh, consider the scenario where the user (105) plans to travel to Dublin for two weeks. Thus, the user (105) will have to transition from a scheduling pattern associated with Raleigh (e.g., events typically scheduled between 8 am and 6 pm, Raleigh time) to a scheduling pattern associated with Dublin (e.g., events typically scheduled between 8 am and 6 pm, Dublin time). However, due to the physical effects of jetlag, the user (105) may have difficulty making an immediate transition from the Raleigh scheduling pattern to the Dublin scheduling pattern. To assist the user (105) in acclimatizing to the change in scheduling pattern, the calendar system (101) may use a stored acclimatization profile (120) to establish an acclimatization period which gradually transitions the user (105) to the new scheduling pattern.

Figure 2:
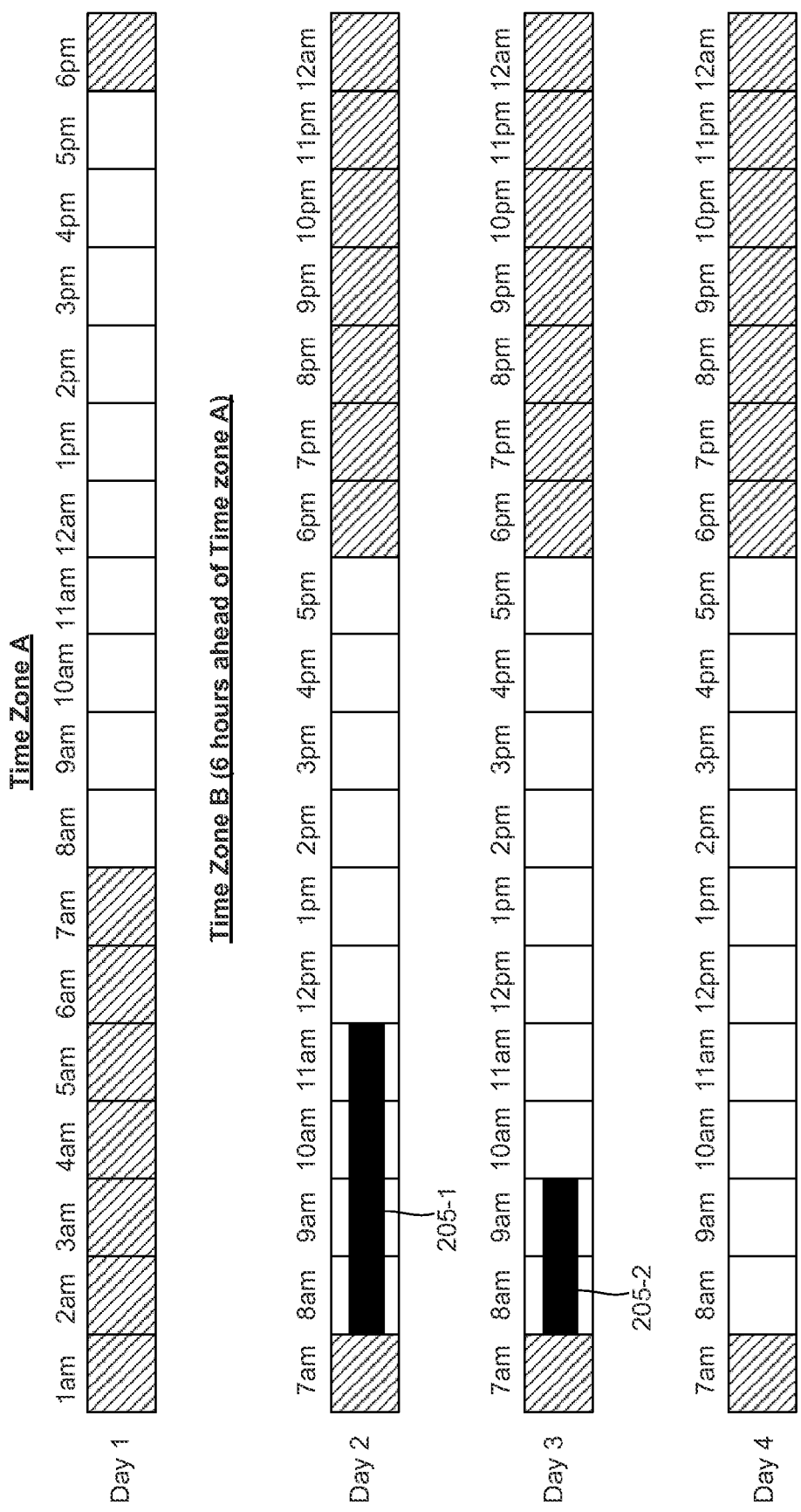
FIG. 2 is a diagram of an illustrative scheduling pattern for a user, according to one example of principles described herein.

FIG. 2 shows a diagram of illustrative scheduling patterns and acclimatization periods (205-1, 205-2) for a user during a transition from a first time zone ("time zone A") to a second time zone ("time zone B"). As shown in FIG. 2, the user may travel from time zone A to time zone B, which is 6 hours ahead of time zone A. Thus, the user (105) may need to transition from a first scheduling pattern associated with time zone A to a second scheduling pattern associated with time zone B. The scheduling patterns associated with the different time zones are shown by the pattern of solid white and cross-hatched blocks in FIG. 2. Under the first scheduling pattern, events may typically be scheduled between 8 am and 6 pm according to the time of time zone A. Under the second scheduling pattern, events may typically be scheduled between 8 am and 6 pm according to the time of time zone B. As such, the second scheduling pattern is essentially the same as the first scheduling pattern with a 6 hour offset.

As described above, the calendar system (101) may check for any previously scheduled or newly scheduled events which fall outside the scheduling pattern for a given day and notify the user (105) if any such events are found. For example, if the user (105) attempts to schedule a new event for 2 pm in time zone A (8 pm in time zone B) on day 3, the calendar system (100 may notify the user (105) that the new event conflicts with the scheduling pattern assigned to day 3 and recommend that the user (105) reschedule the event for a time that is consistent with the scheduling pattern for day 3 (i.e. between 8 am and 6 pm in time zone B). The user (105) may then choose whether to leave the event scheduled for outside of the scheduling pattern for day 3 or to move the event to a different time.

Furthermore, to aid the user (105) in becoming physically acclimatized to the second scheduling pattern, the calendar system (101) may establish acclimatization periods (205-1, 205-2) that gradually transition the user (105) to the second scheduling pattern. In the example of FIG. 2, the acclimatization periods (205-1, 205-2) transition the user (105) to the second scheduling pattern by third day that the user (105) is in time zone B ("Day 4"). The acclimatization periods (205-1, 205-2) block out additional time from the second scheduling pattern to account for time the user (105) may need to physically adjust to the second time zone. Once the acclimatization periods (205-1, 205-2) have been established for the user (105) during day 2 and day 3, the calendar system (101) may check to see if any events have already been scheduled for the user (105) within the acclimatization periods (205-1, 205-2).

For any event that has been scheduled for the user (105) during an acclimatization periods (205-1, 205-2), the calendar system (101) may prompt the user (105) to reschedule the event to a time that is within the second scheduling pattern and outside of any acclimatization period (205-1, 205-2). If such rescheduling is impossible or undesirable, the user (105) may choose to override the suggestion of the calendar system (101) and leave the event scheduled as it is. Additionally or alternatively, the calendar system (101) may be configured to automatically reschedule any event that conflicts with an acclimatization period (205-1, 205-2) to a time that does not conflict with the acclimatization period (205-1, 205-2) or the scheduling pattern, if such a time is available.

Additionally, after the acclimatization periods (205-1, 205-2) have been established, the calendar system (101) may monitor new events which the user (105) attempts to schedule or to which the user (105) is invited. If any of these new events conflicts with an acclimatization period (205-1, 205-2), the calendar system (101) may prompt to the user (105) to reschedule the event to a different time and/or automatically attempt reschedule the event for a new time outside of the acclimatization period (205-1, 205-2).

Figure 3:
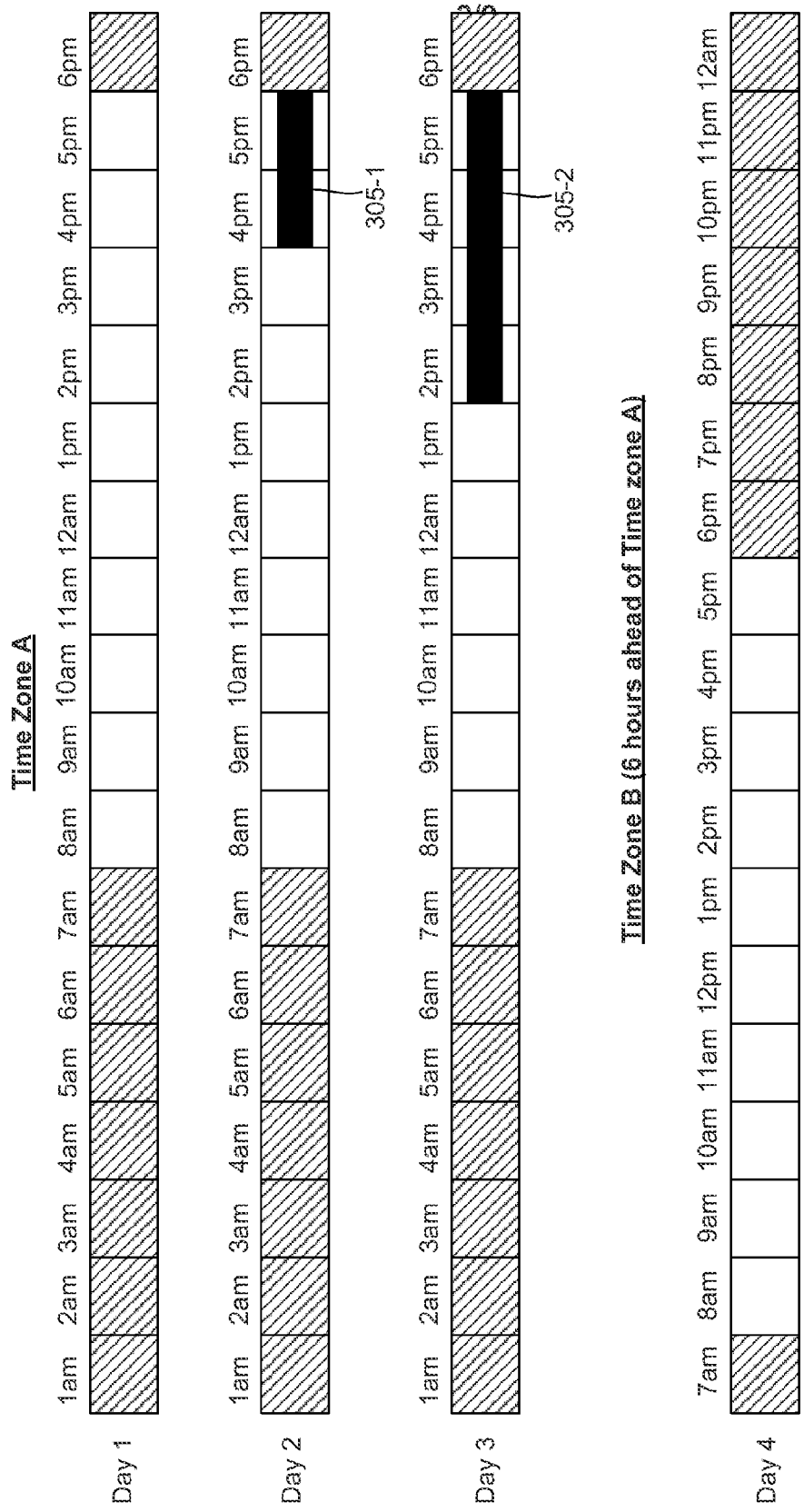
FIG. 3 is a diagram of illustrative scheduling patterns and acclimatization periods for a user, according to one example of principles described herein.

FIG. 3 illustrates an alternate approach of transitioning from a first scheduling pattern associated with a first time zone to a second scheduling pattern associated with a second time zone. Like the example of FIG. 2, the first scheduling pattern provides for the scheduling of events between the hours of 8 am and 6 pm in time zone A, and the second scheduling pattern provides for the scheduling of events between the hours of 8 am and 6 pm in time zone B, which is six hours ahead of time zone A.

It may be desirable for the user (105) to make at least part of the transition to the scheduling pattern of time zone B before the user (105) actually travels to time zone B. In this way, the user (105) may be better equipped, mentally and physically, to attend events scheduled for early in the morning upon her arrival to time zone B. For this reason, in the example of FIG. 3, the acclimatization periods (305-1, 305-2) occur on days prior to when the user (105) actually travels to time zone B. The acclimatization periods (305-1, 305-2) of this example gradually shorten the work day of the user (105) in time zone A leading up to the user's trip to time zone B, thereby encouraging the user (105) begin his or her sleep schedule earlier in preparation for the move to time zone B.

Figure 4:
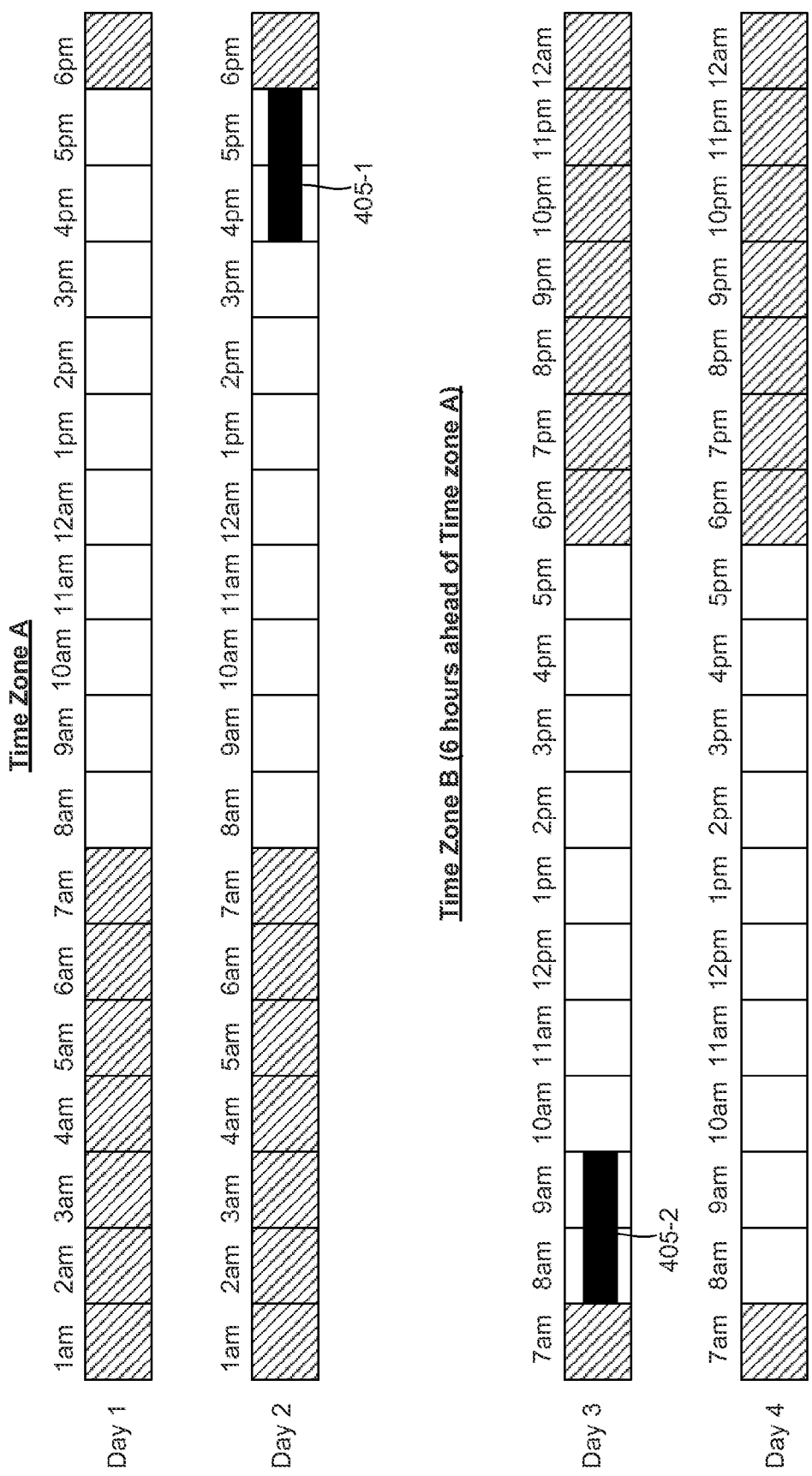
FIG. 4 is a diagram of illustrative scheduling patterns and acclimatization periods for a user, according to one example of principles described herein.

FIG. 4 illustrates yet another alternate approach of transitioning from a first scheduling pattern associated with a first time zone to a second scheduling pattern associated with a second time zone. Like the examples of FIGS. 2-3, the first scheduling pattern provides for the scheduling of events between the hours of 8 am and 6 pm in time zone A, and the second scheduling pattern provides for the scheduling of events between the hours of 8 am and 6 pm in time zone B, which is six hours ahead of time zone A. Unlike FIGS. 2-3, the acclimatization periods (405-1, 405-2) of FIG. 4 divide the user's acclimatization to time zone B between the day immediately prior to travelling to time zone B and her first day in time zone B.

Figure 5A:
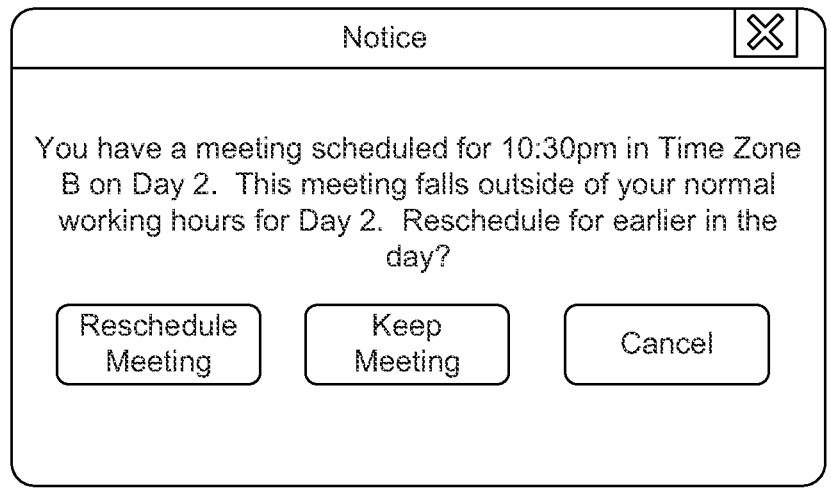
FIGS. 5A and 5B are diagrams of illustrative popup windows that may be displayed by a computerized calendar system to a user, according to one example of principles described herein.
Figure 5B:
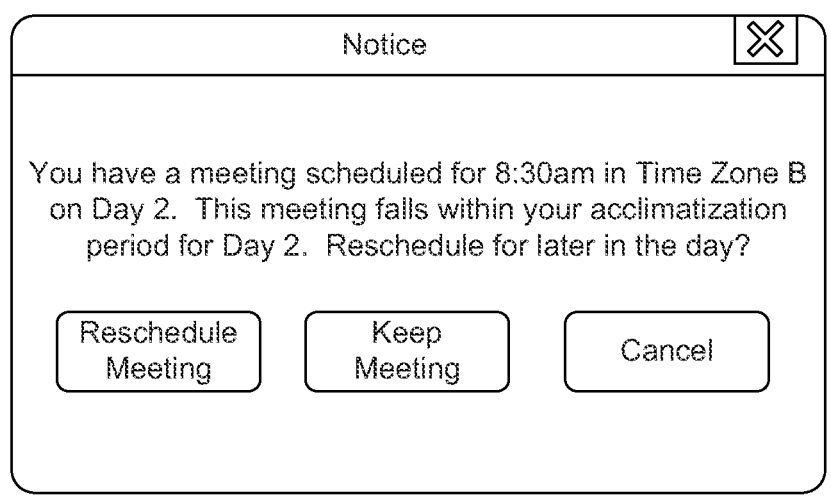

FIGS. 5A and 5B show illustrative popup windows (510, 515) that may be used by the calendar system (101) in some examples to notify the user (105) of a conflict between a new or previously scheduled event in the user's calendar and a scheduling pattern or acclimatization period for the day on which the event is scheduled. FIG. 5A shows a popup window (510) notifying the user (105) of a conflict with the scheduling pattern for the scheduled day, and FIG. 5B shows a popup window (515) notifying the user (105) of a conflict with the acclimatization period for a scheduled day. This type of popup window (510, 515) may be displayed to the user (105), for example, immediately after the user (105) attempts to schedule an event that conflicts with either the scheduling pattern or an acclimatization period for the day of the event. Additionally or alternatively, this type of popup window (510, 515) may also be displayed to the user (105) after the calendar system (101) detects a conflict between a previously scheduled event and the scheduling pattern or an acclimatization period for the day on which the event is scheduled.

Figure 6:
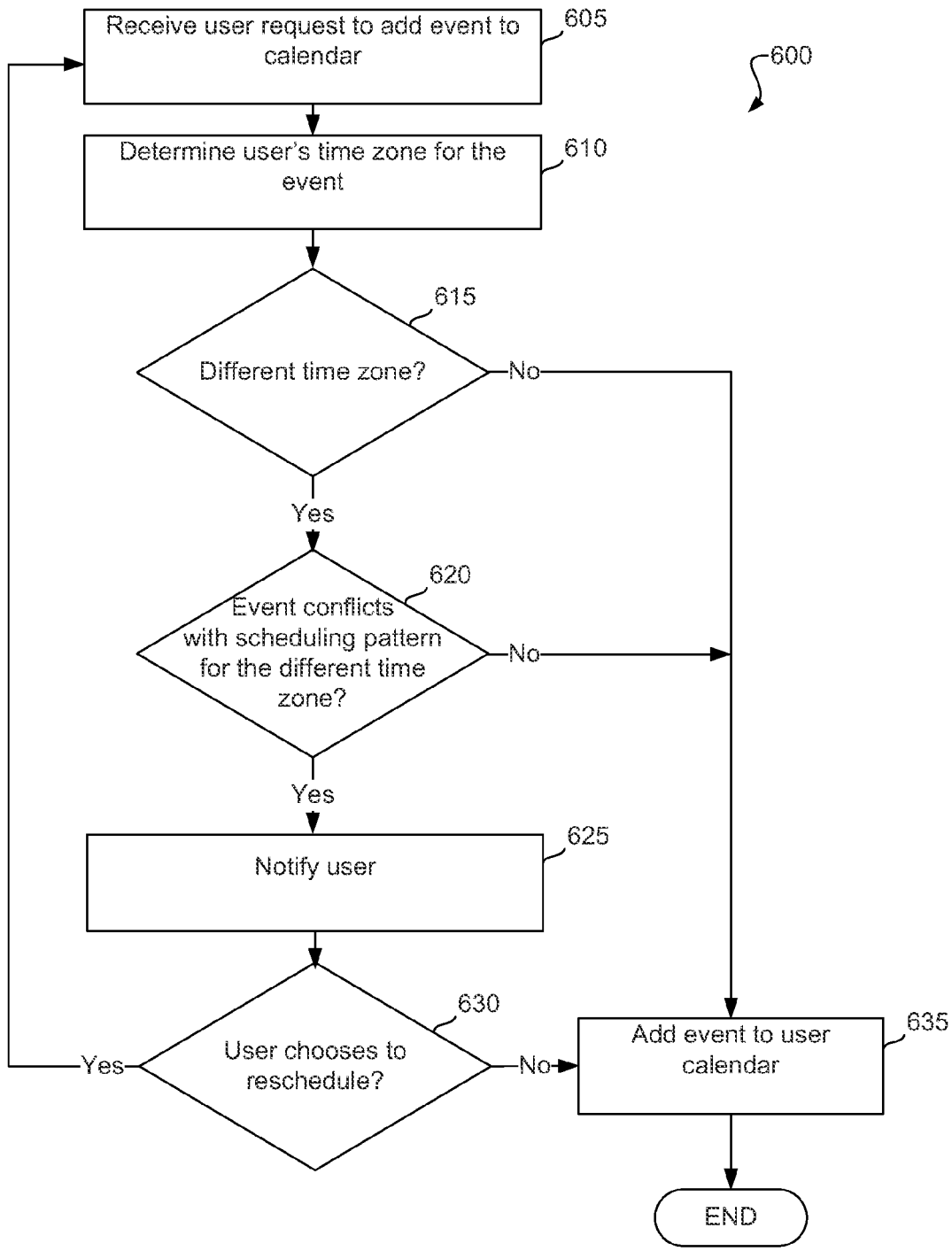
FIG. 6 is a flowchart diagram of an illustrative method of scheduling an event in a computerized calendar system, according to one example of principles described herein.

FIG. 6 is a flowchart diagram of an illustrative method (600) of scheduling an event for a different time zone. The method (600) may be performed for example, by a computerized calendar system conforming to the description given above. In the method (600), a user request to add an event to the calendar for the user is received (block 605). A determination is then made (block 610) of a time zone in which the user is expected to be during the scheduled event. This determination may be made using information from any number of data sources, including manual input from the user, records in a vacation planning or travel booking service for the user, circumstantial data associated with the event itself (e.g., geographic location of the meeting), circumstantial data associated with other events in the user's calendar, and/or any other source that may be suitable to a particular application of these principles.

Once the user's time zone for the event has been ascertained, a determination (block 615) is made as to whether the user's time zone for the event is different from a current time zone of the user. If the user's time zone for the event is not different from the current time zone (block 615, NO), the event is added (block 635) to the user's calendar, Otherwise (block 615, YES), a determination (block 620) is made as to whether the event conflicts with a scheduling pattern corresponding to the different time zone. For example, if a scheduling pattern for the different time zone specifies that most scheduled events will fall between the hours of 8 am and 6 pm of that time zone, an event scheduled for outside of these hours would conflict with the scheduling pattern for that time zone.

If the event does not conflict with the scheduling pattern for the different time zone (block 620, NO), the event is added to the user's calendar (block 635). If the event does conflict with the scheduling pattern for the different time zone (block 620, YES), the user is notified (block 625) of the conflict and prompted to reschedule the event. If the user chooses to reschedule the event (block 630, YES), flow is returned to block 605. Otherwise (block 630, NO), the event is added (block 635) to the calendar for the user.

Additionally or alternatively, if the event conflicts with the scheduling pattern for the different time zone, the calendar system implementing the method (600) may attempt to find non-conflicting alternative times for the event that conform to the scheduling pattern for the different time zone. In certain examples, the calendar system may give the user the option to either keep the event at its originally proposed time or reschedule the event for one of the non-conflicting alternative times. Alternatively, the calendar system may automatically reschedule the event for one of the non-conflicting alternative times or prompt the user to reschedule the event with the option to choose one of the non-conflicting alternative times found by the system.

Figure 7A:
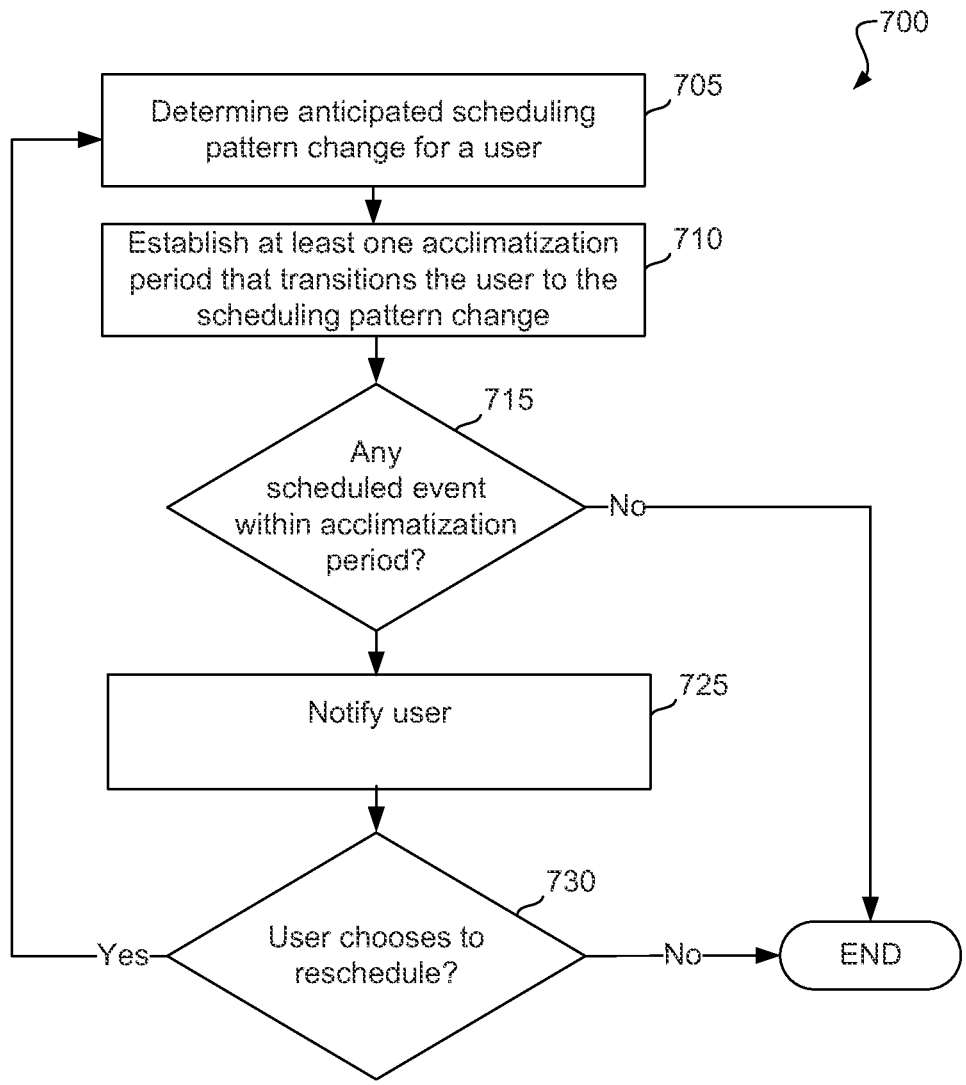
FIGS. 7A-7B are flowchart diagrams illustrative methods of acclimatizing a user to a scheduling pattern change, according to one example of principles described herein.

FIG. 7A is a flowchart diagram of an illustrative method (700) of acclimatizing a user to a change in a scheduling pattern, such as a change from a scheduling pattern associated with a first time zone to a change in a scheduling pattern associated with a second time zone. In the method, a determination is made that a scheduling pattern change for the user will occur (block 705). At least one acclimatization period is then established (block 710), the acclimatization period(s) transitioning the user to the anticipated scheduling pattern change. A determination (block 715) is then made as to whether any event scheduled for the user falls within the acclimatization period(s). In some examples, this determination may be performed as the acclimatization period(s) are initially established, and then again with each new event that the user attempts to schedule in the user's calendar.

If a scheduled event falls within the acclimatization period (block 715, YES), the user is notified (block 725) of the conflict and prompted to reschedule (block 730) the conflicting event. Additionally or alternatively, if the event conflicts with the acclimatization period, the calendar system implementing the method (600) may attempt to find non-conflicting alternative times for the event that conform to the scheduling pattern for the different time zone. At that point, the calendar system may prompt the user to reschedule the event for one of the non-conflicting alternative times or automatically reschedule the event for one of the non-conflicting alternative times.

Figure 7B:
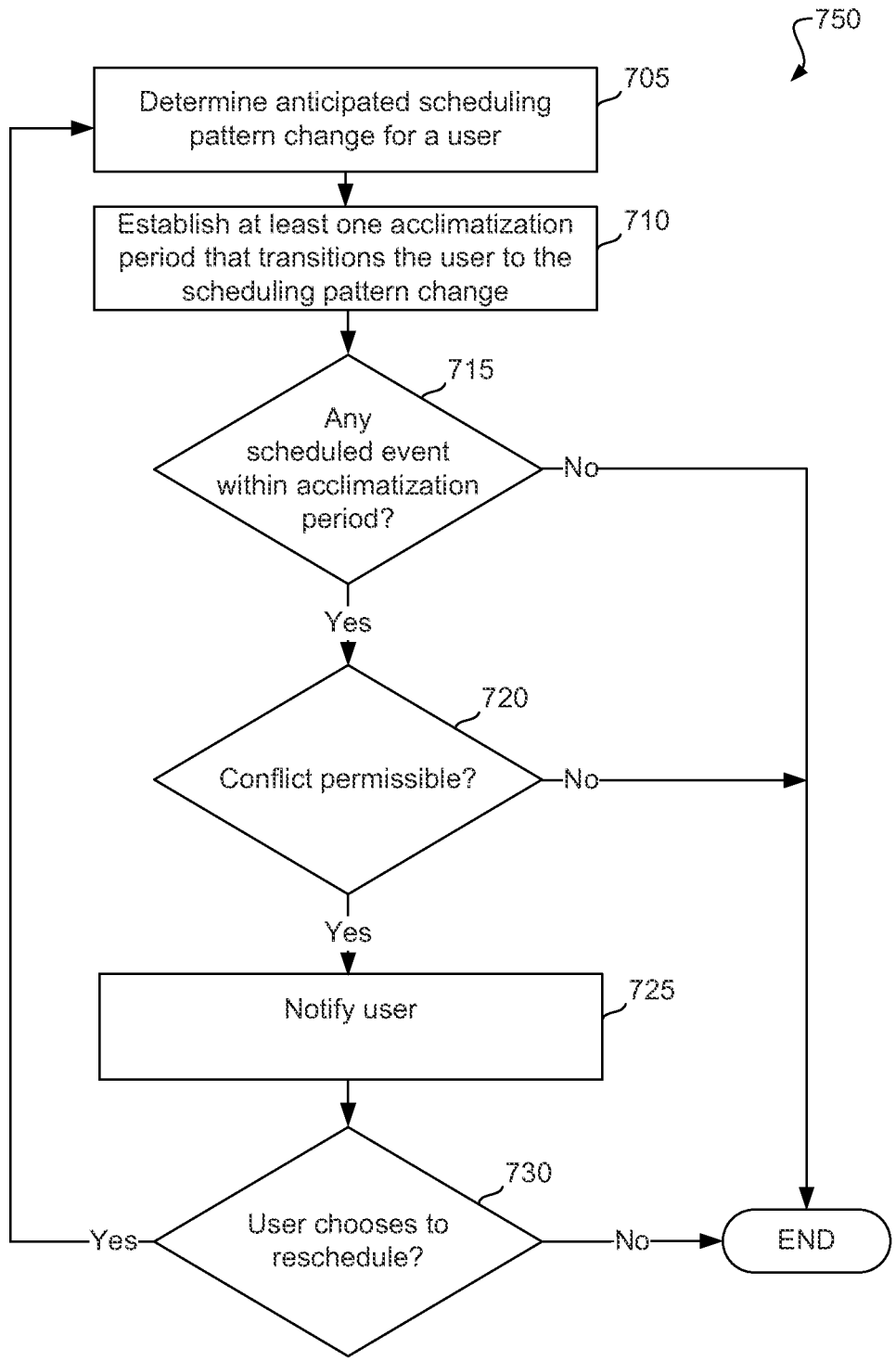

FIG. 7B is a flowchart diagram of another illustrative method (800) of acclimatizing a user to a change in a scheduling pattern, such as a change from a scheduling pattern associated with a first time zone to a change in a scheduling pattern associated with a second time zone, The difference between the method (750) of FIG. 7B and the method (700) of FIG. 7A is that the method (750) of FIG. 7B performs an additional determination of whether an event conflicting with the acclimatization period is permissible (block 720) based on one or more factors prior to notifying the user (725) and prompting the user to reschedule the event. In certain examples, it may be considered permissible that an event conflict with the acclimatization period(s) if the event is considered important enough. The importance of the event may be measured by weighing one or more factors, including the identity of the attendees, the number of attendees, the subject matter of the event, the urgency of the event, the cost of the event, a level of difficulty associated with rescheduling the meeting, and the like. Thus, in some examples, if an importance of the event surpasses a predefined threshold, the event's conflict with the acclimatization period may be considered permissible, and the system will not prompt the user to reschedule the event.

Additionally or alternatively, the importance associated with the event may be weighed against a degree of participation or alertness expected from the user at the event. Thus, if the event is considered very important and a low amount of participation or alertness is expected from the user at the event, it may be determined (block 720, YES) that the event may permissibly conflict with an acclimatization period established for the user. Conversely, if the event is considered to be less important and a high amount of participation is expected from the user, it may be determined (block 720, NO) that the event's conflict with an acclimatization period established for the user is impermissible to the extent that the user may be notified and prompted to reschedule the event for a different time.

Figure 8:
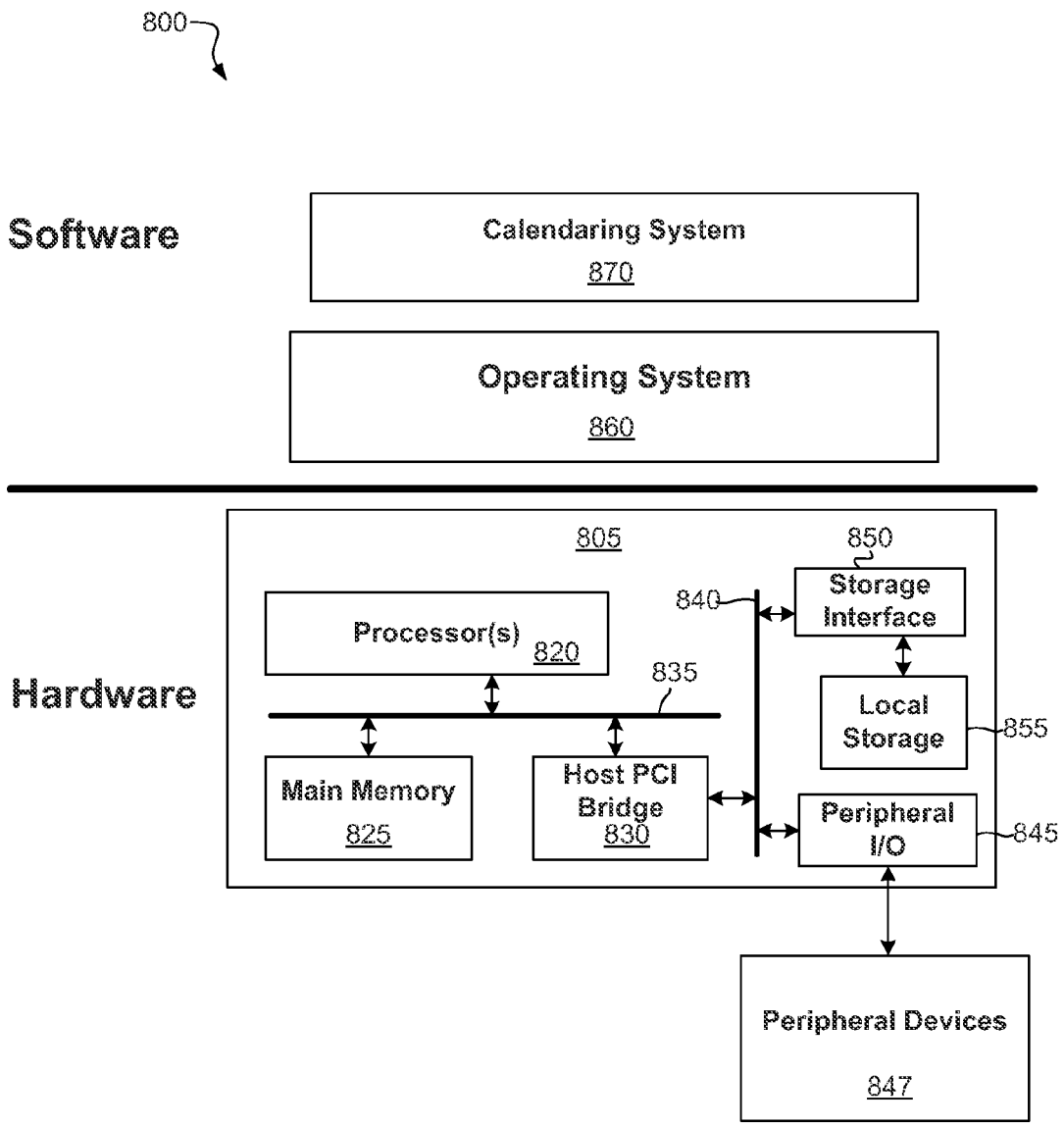
FIG. 8 is a diagram of an illustrative architecture for implementing an illustrative computerized calendar system, according to one example of principles described herein.

FIG. 8 is a block diagram of an illustrative computing device (800) that may be used to execute calendar software as a calendar server, a calendar client device, or a standalone calendar device to implement a computerized calendar system (101, FIG. 1).

The hardware platform (805) of the computing device (800) may include at least one processor (820) that executes code stored in the main memory (825). In certain embodiments, the processor (820) may be a multi-core processor having multiple independent central processing units (CPUs), with each CPU having its own L1 cache and all CPUs sharing a common bus interface and L2 cache. Alternatively, the processor (820) may be a single-core processor.

The at least one processor (820) may be communicatively coupled to the main memory (825) of the hardware platform and a host peripheral control interface bridge (PCI) (830) through a main bus (835). The main memory (825) may include dynamic non-volatile memory, such as random access memory (RAM). The main memory (825) may store executable code and data that is obtainable by the processor (820) through the main bus (835).

The host PCI bridge (830) may act as an interface between the main bus (835) and a peripheral bus (840) used to communicate with peripheral device interfaces (845). Among these peripheral devices (847) that interface to the processor (880) may be a network interface controller, external human interface devices (e.g., monitor, keyboard, mouse, touch screen, speaker, microphone), other external devices (e.g., external storage, dongles, specialized tools), serial buses (e.g., Universal Serial Bus (USB)), and the like. A local storage interface (850) for communicating with local storage devices (855) may also communicate with the peripheral bus (840).

The present configuration of the hardware platform (805) is merely illustrative of one type of hardware platform (805) that may be used in connection with the principles described in the present specification. The hardware platform (805) shown in the lower half of the diagram of FIG. 8 is configured to implement the elements of software functionality shown in the upper half of the diagram of FIG. 8. Thus, as shown in FIG. 8, an operating system (860) program is executed directly by the hardware platform (805). The operating system (860) may interact with and manage the performance of hardware resources in the hardware platform (805), including the processor(s) (820), the main memory (825), and the peripheral devices (847, 855). Thus, the operating system (860) controls the execution of computer programs by the processor(s) (820). Among these computer programs may include calendar software (870) which causes the processor(s) (820) to implement a computerized calendar system, such as the computerized calendar system (101, FIG. 1) shown in FIG. 1.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of acclimatizing a user to a scheduling pattern change, comprising:
in a calendar system implemented by at least one processor, determining an anticipated scheduling pattern change for said user;
establishing with said calendar system an acclimatization period to transition said user to said scheduling pattern change;
receiving in said calendar system a request to schedule an event for said user at a time within said acclimatization period; and
prompting said user to reschedule said event to a time outside of said acclimatization period with said calendar system.

2. The method of claim 1, wherein determining said anticipated scheduling pattern change for said user comprises:
determining an anticipated change of location for said user; and
determining that a scheduling pattern for said user at said changed location is different from a scheduling pattern for said user at a preceding location in a calendar of said user.

3. The method of claim 2, wherein determining said anticipated change of location for said user comprises analyzing a travel plan for said user to determine said anticipated location of said user during said time of said event.

4. The method of claim 2, wherein determining said anticipated change of location for said user comprises analyzing circumstantial data associated with a calendar of said user to determine said anticipated location of said user during said time of said event.

5. The method of claim 2, wherein said anticipated scheduling pattern change comprises a shift from a first daily period of time during which events are typically scheduled in a first time zone to a second daily period of time during which events are typically scheduled in a second time zone.

6. The method of claim 1, further comprising establishing a plurality of acclimatization periods for said user, said plurality of acclimatization periods gradually transitioning said user from a current scheduling pattern to a new scheduling pattern; wherein rescheduling said event to said time outside of said acclimatization period comprises rescheduling any event scheduled for said user within any of said acclimatization periods for a time outside of each of said acclimatization periods.

7. The method of claim 1, further comprising determining at least one time falling outside said acclimatization period during which said user is available;
wherein prompting said user to reschedule said event comprises providing said user an option to reschedule said event for said at least one time falling outside said acclimatization period during which said user is available.

8. The method of claim 1, wherein prompting said user to reschedule said event comprises notifying said user that said event falls within said acclimatization period and allowing said user to choose between proceeding to schedule said event for said time within said acclimatization period and rescheduling said event for a different time.

9. A method of acclimatizing a user to a scheduling pattern change, comprising:
in a calendar system implemented by at least one processor, determining an anticipated scheduling pattern change for said user;
establishing with said calendar system an acclimatization period to transition said user to said scheduling pattern change;
determining that an event scheduled for said user falls within said acclimatization period; and
determining whether to prompt said user to reschedule said event to a time outside of said acclimatization period based on at least one attribute associated with said event.

10. The method of claim 9, wherein said at least one attribute comprises a degree of importance associated with said event.

11. The method of claim 9, wherein said at least one attribute comprises a degree of alertness expected from said user at said event.

12. The method of claim 9, wherein said at least one attribute comprises a degree of importance associated with attendance by said user.

13. The method of claim 9, wherein said anticipated scheduling pattern change comprises an anticipated change of time zone.

14. The method of claim 13, wherein determining said anticipated scheduling pattern change for said user comprises analyzing a travel plan for said user to determine said anticipated change of time zone for said user.

15. The method of claim 9, further comprising rescheduling said event to said time outside of said acclimatization period in response to a determination to reschedule said event.

16. The method of claim 15, further comprising establishing a plurality of acclimatization periods for said user, said plurality of acclimatization periods gradually transitioning said user from a current scheduling pattern to a new scheduling pattern; wherein rescheduling said event to said time outside of said acclimatization period comprises rescheduling any event scheduled for said user within any of said acclimatization periods for a time outside of each of said acclimatization periods.

17. The method of claim 16, wherein rescheduling said event scheduled for said user within said acclimatization period to a time outside of said acclimatization period comprises prompting said user to reschedule said event and rescheduling said event to a time selected by said user.

18. The method of claim 16, further comprising determining typical business hours defined by one of said scheduling patterns for a day on which said event is scheduled.

19. The method of claim 18, wherein said time outside of said acclimatization period is within said typical business hours for said day on which said event is scheduled.

20. A computer program product for acclimatizing a user to a scheduling pattern change, said computer program product comprising:
- a tangible computer readable storage medium having computer readable program code embodied therewith, said computer readable program code comprising:
- computer readable program code configured to determine an anticipated scheduling pattern change for said user;
- computer readable program code configured to establish an acclimatization period to transition said user to said scheduling pattern change;
- computer readable program code configured to receive a request to schedule an event in a calendar for said user at a time within said acclimatization period; and
- computer readable program code configured to prompt said user to reschedule said event to a time outside of said acclimatization period.

* * * * *